N. POWER.
TIME INDICATOR FOR MOVING PICTURE MACHINES.
APPLICATION FILED OCT. 2, 1913.
1,209,493.
Patented Dec. 19, 1916.
2 SHEETS—SHEET 2.
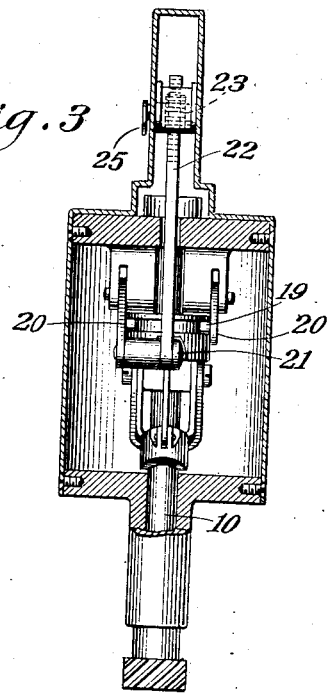
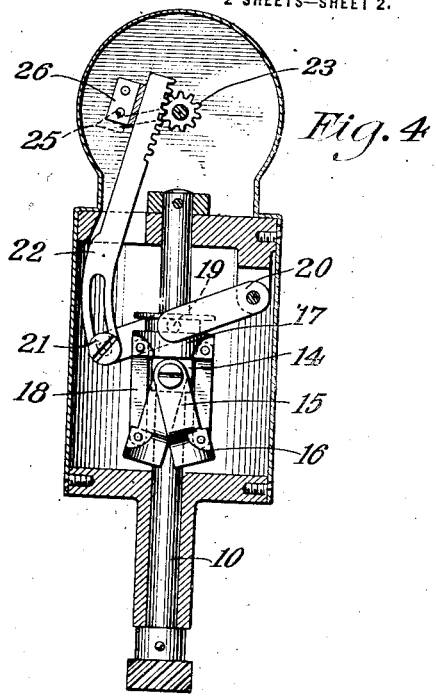
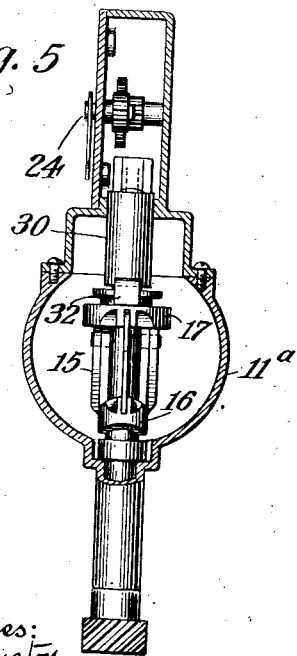
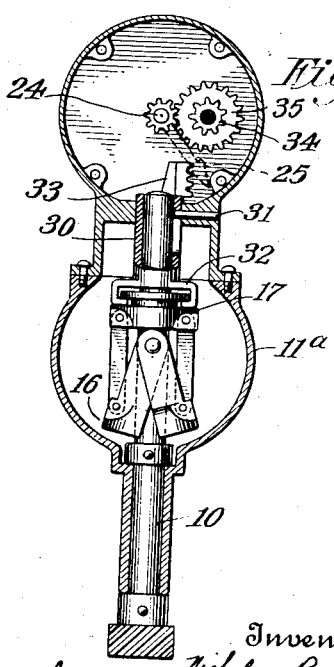
Witnesses:
L. E. Johnston
M. E. Eveland
Inventor
Nicholas Power
By his Attorney
W. B. Morton

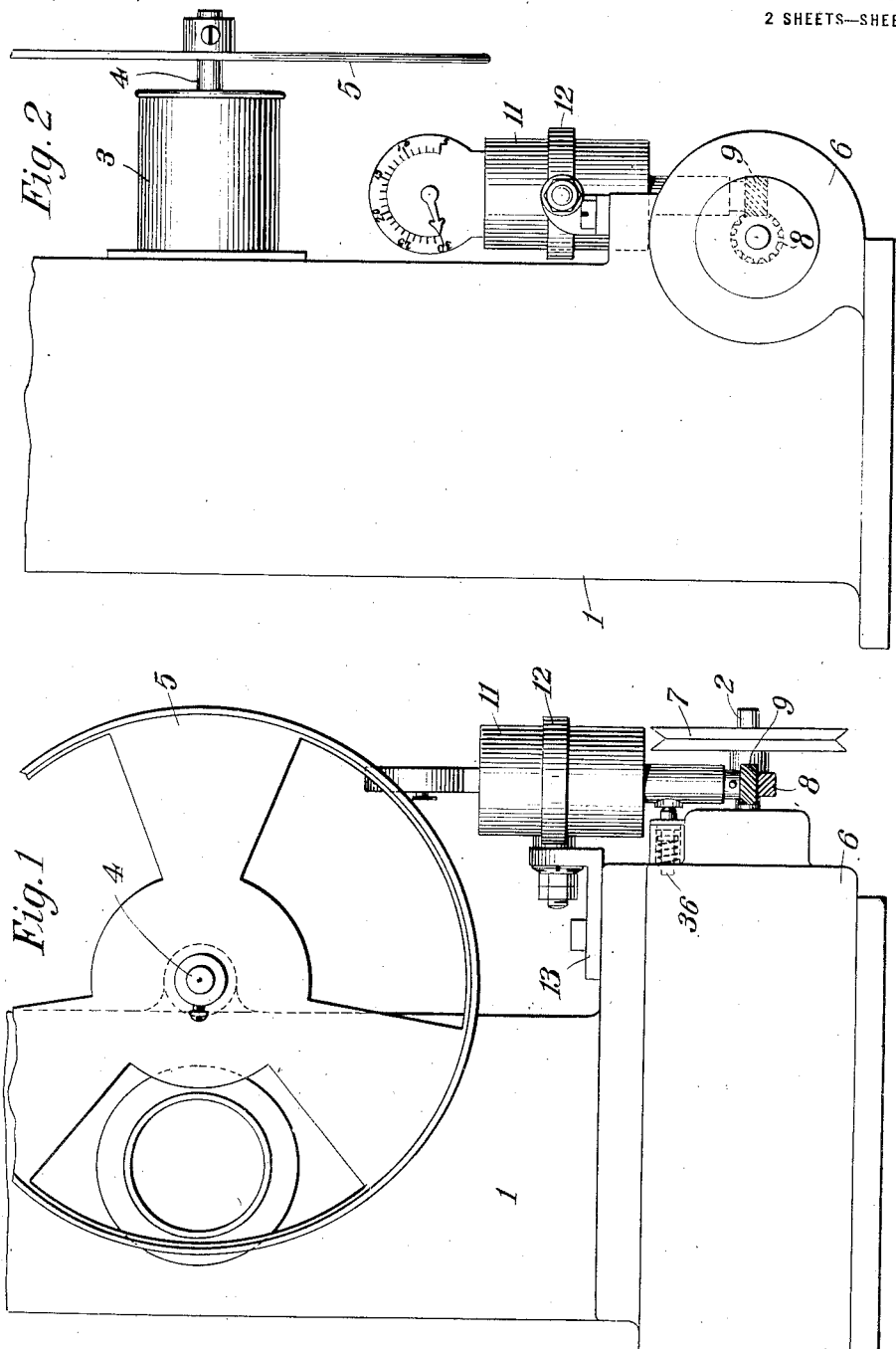

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

TIME-INDICATOR FOR MOVING-PICTURE MACHINES.

1,209,493.   Specification of Letters Patent.   Patented Dec. 19, 1916.

Application filed October 2, 1913. Serial No. 792,927.

*To all whom it may concern:*

Be it known that I, NICHOLAS POWER, a citizen of the United States, and resident of Brooklyn, in the county of Kings and State of New York, have invented new and useful Improvements in Time-Indicators for Moving-Picture Machines, of which the following is a specification.

This invention relates to moving picture machines, and has for its object to provide means whereby the operator may at all times be able to tell definitely the time, at the speed at which his machine is running, that it will take to complete the exhibition of the roll of film in the machine. The rolls of film for moving picture machines are furnished in reels of approximately one thousand feet in length, and to get the correct reproduction of the scenes and action, the machine should be run at a definite speed which is usually given with each reel by furnishing instructions for the operator that the exhibition of the reel is to require a certain number of minutes. With the invention of the present application, the operator can, without taking his attention from the running of the machine, determine at all times whether the machine is running at the proper speed to exhibit the film in the manner intended.

In the accompanying drawings, forming a part of this specification, Figure 1 shows a front view of a moving picture machine equipped with my improved device; Fig. 2 is a side view looking from the left of Fig. 1; Figs. 3 and 4 are vertical sections of the indicating device proper; and Figs. 5 and 6 are similar views of a modified form of indicator.

Referring now to the drawings, 1 indicates the so-called "head" of the machine in which is mounted the feed mechanism for the film, not shown, but which is driven from the shaft 2 to feed the pictures on the film successively past the lens tube 3, through which they are projected on the screen. Adjacent the lens tube is the shutter shaft 4, on the forward end of which is rigidly mounted the shutter 5, the shaft being long enough to allow the shutter to clear the lens tube.

The shaft 2 is rotatably mounted in the gearbox 6, forming part of the head 1, and to the projecting end of the shaft there is rigidly attached a driving wheel 7, by which the macine is driven from any suitable source of power. Between the wheel 7 and the end of the gearbox, a spiral gear 8 is rigidly attached to the shaft 2, and meshing with this gear is a gear 9 carried by the shaft 10 of the indicator, which will now be described, with particular reference to Figs. 3 and 4.

The indicator comprises a casing 11, supported on the machine head by means of a strap 12 surrounding the casing, and pivotally connected to a bracket 13 supported on the adjacent end of the gearbox 6. The casing 11 is provided at each end with bearings for the shaft 10, and attached to the shaft within the casing is a squared block 14. To the opposite faces of the block 14 are pivotally attached the spaced arms 15 of two governor weights 16, which normally depend from the block, and are provided with concaved inner faces to permit them to closely surround the shaft. Keyed to the shaft 10 above the block 14 is a sleeve 17 connected on opposite sides with the weights 16 by means of links 18. The sleeve 17 is grooved at its upper end for the reception of pins 19 carried by a yoke 20 pivoted in the casing. One arm of the yoke 20 extends beyond the sleeve 17 and is provided at its end with a pin 21 which engages a curved slot at the lower end of the rack bar 22. The teeth of the bar 22 are in mesh with pinion 23 of the shaft of an indicator hand 25, which is mounted at the center of a hollow dial attached to the top of the casing 11.

The teeth of the bar are held in mesh with the pinion by means of a guide 26 contained in the dial, it being understood that the fit is loose enough to accommodate the slight angular motion of the bar which would be effected by the pivotal movement of the yoke 20.

The face of the dial is provided with a scale which is preferably marked as will be later described.

The operation of the device will be obvious from the foregoing description. When the machine is running, the shaft 10 will be driven through the gears 8 and 9, and the weights 16 will be thrown away from the shaft by centrifugal force, raising the yoke 20 and pin 21. When the speed of the machine is at a certain point, the pin will engage the top of the slot in the bar 22 and raise the bar, thereby turning the hand 25 to a position on its scale corresponding to the speed at which the machine is being run. The slot in the bar 22 is of such length that the bar will not be actuated until the machine is running at the lowest speed at which a successful exhibition can be given. The scale on the dial is preferably marked in minutes to indicate the length of time required to run a thousand foot reel at the speed indicated by the hand, and the numbers on the dial correspond with the directions given the operator for running the particular film.

An important feature of my improvement is the arrangement of the indicator so that its dial lies in the space between the shutter 5 and the face of the machine. In operating machines of this character, the operator stands at the side of the machine opposite the driving wheel 7, the hand crank for use when the motor is not in operation being at that side of the machine. His normal line of vision is therefore across the front of the machine where the dial of the indicator is positioned. It is necessarily dark in the theater when the machine is in use, but by arranging the indicator as shown, its dial is illuminated by the light reflected from the wings of the revolving shutter as they pass the lens tube 3. By having the dial and indicator hand of contrasting colors, for instance, a nickle plated hand on a black dial, the indicator can be easily read without additional light.

In Figs. 5 and 6 I have shown a modified form of indicator, the chief feature of the modification being to get a greater movement of the hand for a smaller movement of the governor weights, so that the size of the device may be reduced as far as possible. This modified device comprises a casing 11ª, containing a shaft 10, block 14, weights 16 and sleeve 17, all similar to the previously described construction. Mounted on the shaft beyond the sleeve 17 is a sleeve 30 which is held against rotation by a pin 31 through the wall of the casing, and working in a slot in the sleeve. The sleeve 30 is connected to the sleeve 17 by means of yoke arms 32 which engage the slot of the sleeve and permit the sleeve 17 to rotate freely, but to transmit its vertical movement to the sleeve 30. At the upper end of the sleeve 30 is a short rack 33 whose teeth engage a pinion 34 on a small stud within the dial. The pinion 34 is fast to a larger gear 35 which meshes with pinion 23 of the indicator hand 25. The rack 33 is normally out of mesh with the pinion 34, and its length is such that it will not engage the pinion until the speed of the machine reaches the desired minimum speed. This indicator will be mounted on the machine by means of a strap and bracket similar to the previously described construction, this mounting being provided to permit the indicator to be slightly tilted to one side when it is desired for any reason not to have the same in operation. Spring pin 36 is provided to hold the indicator in either its operative or inoperative positions.

Having thus described my invention what I claim and desire to secure by Letters Patent is:

1. The combination in a moving picture machine having a projection aperture and means for feeding the film through said machine, of a shutter for intercepting the light through said aperture and an indicator driven by said film feeding mechanism and having its dial positioned in the path of light reflected from said shutter.

2. The combination of a moving picture machine embodying a frame and having a driving shaft extending across said frame, a shutter mounted in front of said frame for intercepting the light through said machine, and a speed indicator supported by said frame in a position in front of the front wall thereof and to the rear of the plane of the shutter.

3. The combination of a moving picture machine embodying a frame and having a driving shaft extending across said frame, a shutter mounted in front of said frame for intercepting the light through said machine, and a speed indicator supported by said frame in a position in front of the front wall, to the rear of the plane of the shutter and beyond the side wall of the frame, and having its dial on the side to be visible from the opposite side of said casing.

Signed at New York in the county of New York and State of New York, this 26th day of September, 1913.

NICHOLAS POWER.

Witnesses:
LAWRENCE W. ATWATER,
E. EDE HART.